(12) United States Patent
Nzeadibe et al.

(10) Patent No.: US 8,806,925 B2
(45) Date of Patent: Aug. 19, 2014

(54) MECHANICAL PACKAGING TECHNIQUE OF ATTACHING MEMS AND FLEX CIRCUIT

(75) Inventors: Ihioma U. Nzeadibe, Brentwood, CA (US); Javed Hussain, Cupertino, CA (US); Joseph Castagna, San Jose, CA (US); Li Yuan, Fremont, CA (US); Roger Horton, Sunnyvale, CA (US)

(73) Assignee: S3C, Inc., Sunnyvale, CA (US)

( * ) Notice: Subject to any disclaimer, the term of this patent is extended or adjusted under 35 U.S.C. 154(b) by 180 days.

(21) Appl. No.: 13/430,528

(22) Filed: Mar. 26, 2012

(65) Prior Publication Data

US 2013/0125634 A1 May 23, 2013

Related U.S. Application Data

(60) Provisional application No. 61/563,455, filed on Nov. 23, 2011, provisional application No. 61/577,583, filed on Dec. 19, 2011.

(51) Int. Cl.
*G01M 15/08* (2006.01)
*G01L 23/14* (2006.01)
(52) U.S. Cl.
CPC .................................. *G01L 23/145* (2013.01)
USPC ...................................................... 73/114.18
(58) Field of Classification Search
USPC ................ 73/114.16, 114.18, 114.19, 114.21
See application file for complete search history.

(56) References Cited

U.S. PATENT DOCUMENTS

| | | | |
|---|---|---|---|
| 6,119,667 A * | 9/2000 | Boyer et al. | 123/634 |
| 6,845,664 B1 * | 1/2005 | Okojie | 73/431 |
| 7,543,502 B2 | 6/2009 | Niblock | |
| 8,459,124 B2 * | 6/2013 | Wang et al. | 73/727 |
| 2002/0121135 A1 * | 9/2002 | Rediniotis et al. | 73/170.11 |
| 2009/0078054 A1 | 3/2009 | Romo | |
| 2009/0120164 A1 * | 5/2009 | Anilkumar et al. | 73/35.08 |
| 2009/0320576 A1 | 12/2009 | Borgers et al. | |
| 2010/0229624 A1 * | 9/2010 | Higuchi et al. | 73/1.57 |
| 2011/0088460 A1 * | 4/2011 | Mueller | 73/114.19 |
| 2011/0271748 A1 * | 11/2011 | Maeda et al. | 73/114.18 |
| 2011/0290032 A1 * | 12/2011 | Wang et al. | 73/727 |

OTHER PUBLICATIONS

PCT International Search Report and Written Opinion of the International Searching Authority, Issued Jan. 17, 2013, Application No. PCT/US2012/063901.

\* cited by examiner

*Primary Examiner* — Eric S McCall
(74) *Attorney, Agent, or Firm* — Sawyer Law Group, P.C.

(57) ABSTRACT

The present invention disclosed provides for a rugged, compact sensing device for various implementations including those of automotive, marine, and other combustion technologies that require low cost accurate pressure sensing during internal combustion engine process. In one or more aspects of the present invention, a MEMS sensor connection with a flexible circuit is presented and the communication of which is preferably achieved through the use of wire bond technology.

19 Claims, 9 Drawing Sheets

MECHANICAL PACKAGING TECHNIQUE OF ATTACHING MEMS AND FLEX CIRCUIT

CROSS-REFERENCE TO RELATED APPLICATION

This application claims the benefit of U.S. Provisional Patent Application No. 61/563,455, filed on Nov. 23, 2011, entitled "MECHANICAL PACKAGING TECHNIQUE OF ATTACHING MEMS AND FLEX CIRCUIT," and U.S. Provisional Patent Application No. 61/577,583, filed on Dec. 19, 2011, entitled "MECHANICAL PACKAGING TECHNIQUE OF ATTACHING MEMS AND FLEX CIRCUIT," all of which are incorporated herein by reference in their entirety.

FIELD OF THE INVENTION

The present invention relates generally to combustion process technology and more particularly to accurately measure pressure values within an internal combustion engine (ICE).

BACKGROUND OF THE INVENTION

The increasing demand for emission control from the internal combustion process has led to the development of new combustion optimization methods, such as homogeneous charge compression ignition (HCCI). However, obtaining information and data characteristics from various components during performance testing of an active combustion process is challenging. Typically, operating environments such as those involving ICE equipment and combustion processes involve high temperatures, high pressures, and often caustic operating fluids and fuels. Still, information regarding the combustion process can be determined from various performance characteristics occurring during the process, such as pressure created in the combustion chamber.

It is generally known that the use of high speed, (fast response) pressure sensors when protectively utilized can achieve near real time optimization of the combustion process. However, often these techniques are used in a closed or controlled environment, such as that of a laboratory, whereas real-world commercial applications often demonstrate that laboratory techniques are insufficient in road use testing. Further, these laboratory techniques may employ expensive and fragile equipment that is unable to be economically optimized for other inconveniences of the environment that occur during road tests and normal operation of the ICE. Further, such types of devices are often well-suited for the laboratory environment due to the instrumentation aspects contradistinctive from the needs of most real-world applications.

Additionally, other sensor offerings may be less fragile but are unable to perform accurately for they may require in situ calibration, which is a clear barrier to implementation in environments as described above including automotive and other industries. Further sensing elements used in the current state of the art typically provide pressure sensors, for example, that are premised on piezoelectric elements. These sensing elements, while able to withstand the rigors of combustion pressure (after various treatments to protect the elements), are expensive to fabricate and operate and can be difficult to obtain.

It is also recognized that micro-electromechanical system (MEMS) based sensor devices are useful in achieving control objectives in such environments as an ICE. However, similarly, the use of MEMS devices in such environments are also subject to challenges in part due to the extremes of the operating environment. More particularly, a significant challenge in the application of widespread MEMS based combustion sensing is the need to electrically attach the sensor connections to the signal carrying conductors and maintain the integrity of the operating system during use in extremes of the environment.

Accordingly, what is desired is a cost-effective solution for providing reliable and accurate monitored pressures as related to an internal combustion process with sensors that are responsive to pressure change in near real-time, compact in footprint to enable mobile installation, are well-suited to operating environments of internal combustion engines, and economically advantaged for commercial uses.

As used herein the terms device, apparatus, system, etc. are intended to be inclusive, interchangeable, and/or synonymous with one another and other similar arrangements and equipment for purposes of the present invention though one will recognize that functionally each may have unique characteristics, functions and/or operations which may be specific to its individual capabilities and/or deployment.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention provides for a sensor assembly, comprising: a rigid sensor body adaptively configured for connection with an internal combusting device capable of generating a pressure during operation; wherein the body further comprises a tip and is adaptively configured for connection to the internal combusting device; a pressure sensing device configured at a predetermined position in relation to a distal opening of the tip; a flexible cable connection in electrical communication with the pressure sensing device and capable of transmitting an electrical signal having pressure characteristic information to an information receiving device in communication with the assembly, wherein the flexible cable connection further comprises an electronic communications board for electrical communication, a flexible communications cable for electrical communication with the information receiving device and an internal communications cable situated within the sensor body and in electrical communication with the pressure sensing device, the electronic communications cable being in electrical communication with the flexible communications cable and the internal communications cable.

Another embodiment of the present invention provides for a mechanical packaging assembly for detecting pressure values in an internal combustion engine, the assembly comprising: a stainless steel assembly body capable of electrical communication via a connectable connection and in mechanical mated connection via a fastening to an internal combustion engine, a micro-electromechanical system (MEMS) pressure sensor for sensing pressure within the internal combustion engine, being bonded to a tip of the body positioned at a distal end and being in electrical communication with a flexible circuit connection, wherein the MEMS pressure sensor is situated at a predetermined distance from an opening of the tip; wherein the flexible circuit connection is capable of transmitting an electrical signal having pressure characteristic information from the MEMS pressure sensor to an information receiving device in communication with the assembly and the flexible circuit connection further comprises an electronic communications board for electrical communication, a flexible communications cable for electrical communication with the information receiving device and an internal communications cable situated within the assembly body and in electrical communication with the MEMS sensor, the electronic communications cable being in electrical communication with the flexible communications cable and the internal communications cable.

A further embodiment of the present invention provides for a pressure monitoring assembly comprising: a stainless steel body in electrical signal communication and mechanically fastened to the engine, a micro-electromechanical system (MEMS) pressure sensor secured to a tip of the body and in electrical signal communication via wire bonds to a flexible circuit connection, wherein the pressure sensor is situated less than 15 mm from the tip and the flexible circuit connection is for transmitting an electrical signal having pressure characteristic information determined from the MEMS pressure sensor to a controller in communication with the assembly; wherein the flexible circuit connection is capable of transmitting an electrical signal having pressure characteristic information from the MEMS pressure sensor to the controller in communication with the assembly and the flexible circuit connection further comprises an electronic communications board for electrical communication, a flexible communications cable for electrical communication with the controller and an internal communications cable situated within the assembly body and in electrical communication with the MEMS sensor, the electronic communications cable being in electrical communication with the flexible communications cable and the internal communications cable; and wherein the body further comprises a mating means for securably fastening the assembly and the tip is concentrically aligned with the body and is composed of a material having a thermal coefficient of expansion similar to MEMS pressure sensor.

In one or more preferred embodiments the distance from the tip of the body to the pressure sensor is less than 12 mm to provide for improved timeliness of signal transmissions. Similarly, in each aspect of the present invention the configuration and adaptive configurations available for the present invention protect the MEMs sensor from excessive mechanical stresses due to thermal coefficient of expansion mismatch, as well as provide for a configured arrangement of components to electrically connect the MEMs pressure sensor to the power supply and sensing electronics, while providing operational characteristics to enable the assembly to operate within the operating environment of an internal combustion engine, for instance. The present invention in various aspects incorporates the use of MEMS based combustion sensors providing for direct pressure measurement activities without requiring further calibration systems on the engine.

Further embodiments, forms, objects, features, advantages, aspects, and benefits of the present application shall become apparent from the detailed description and drawings included herein.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention disclosed provides for a rugged, compact sensing device for various implementations including those of automotive, marine, and other combustion technologies that require low cost accurate pressure sensing during internal combustion engine process. In one or more aspects of the present invention, a MEMS sensor connection with a flexible circuit is presented and the communication of which is preferably achieved through the use of wire bond technology.

This present invention provides for adaptively configuring a MEMS pressure sensor to be in close proximity to the pressure port for enabling real time pressure sensing.

Figure 1A:
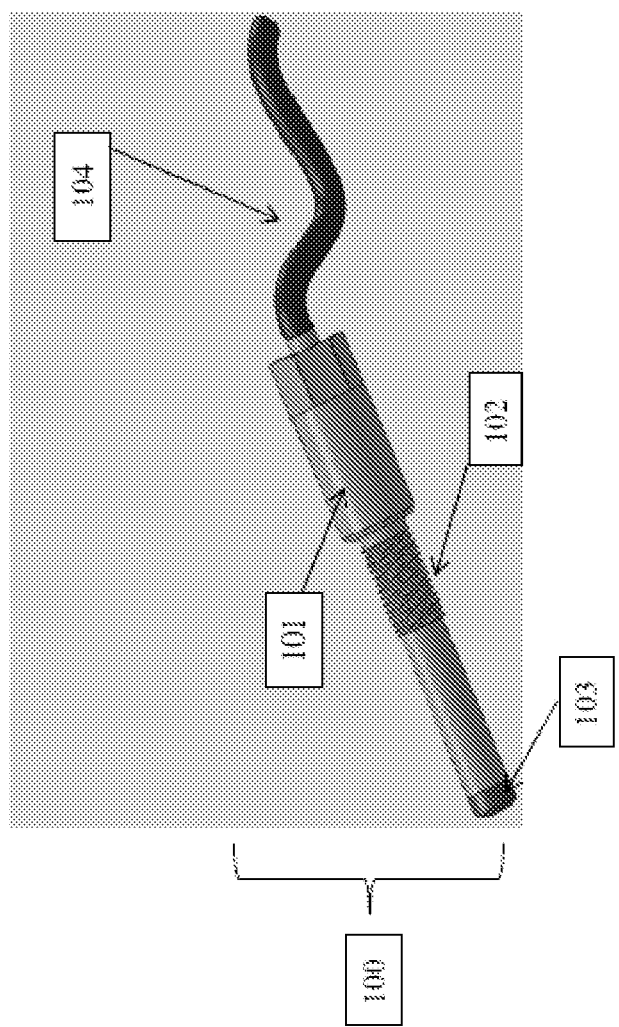
FIG. 1A illustrates an arrangement of the combustion sensor in accordance with an aspect of the present invention.
Figure 1B:
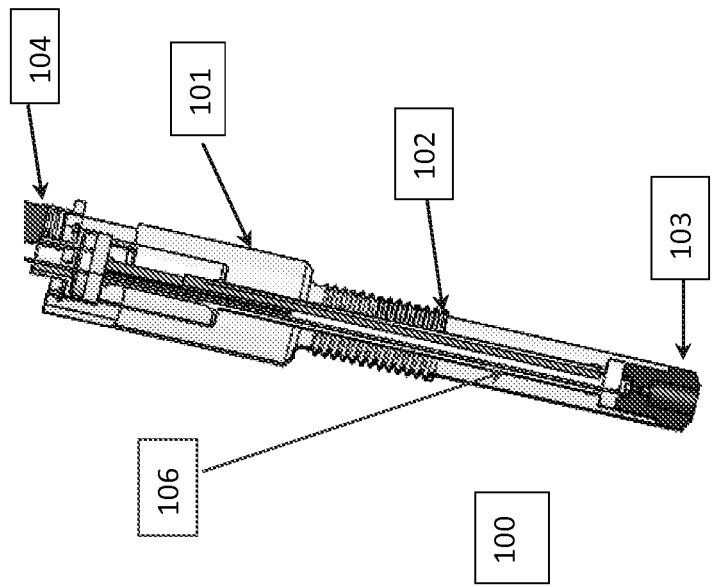
FIG. 1B illustrates a cross-sectional view of the sensor assembly of FIG. 1A.

FIG. 1A illustrates an arrangement of the combustion sensor in accordance with an aspect of the present invention. From FIG. 1A, the sensor body 101 is shaped and comprised to provide structural rigidity to the sensor assembly 100, as well as mechanical fastening utilizing screw thread 102 that engages mating threads in the head of an internal combustion engine (not pictured). In a preferred embodiment, the sensor body 101 is fabricated from stainless steel. A suitably tapered tip 103 distal from the screw thread 102 forms a pressure tight seal with a pressure port in the head of the ICE. The tip 103, in a preferred embodiment, is configured to also provide reduction in temperature induced stresses on the pressure sensing MEMS assembly by its configuration and composition, as the tip is preferably fabricated from a material with a thermal coefficient of expansion similar to that of the MEMs assembly. In a further preferred embodiment of the invention the tip 103 is fabricated from Kovar™ and preferably attached to the sensor body 101 by laser welding (Kovar™ is a trademark of Carpenter Technology Corporation). Cable 104 provides the electrical connection necessary to communicate with other electronics in communications with the assembly such as control electronics (not pictured), for example. FIG. 1B illustrates a cross-sectional view of the sensor assembly of FIG. 1A. The sensor assembly further includes internal flex cable 106, which is of a predetermined shape to provide the necessary electrical traces for circuit connection, as well as the critical features for completing the electrical connection to the MEMS sensor.

Figure 2:
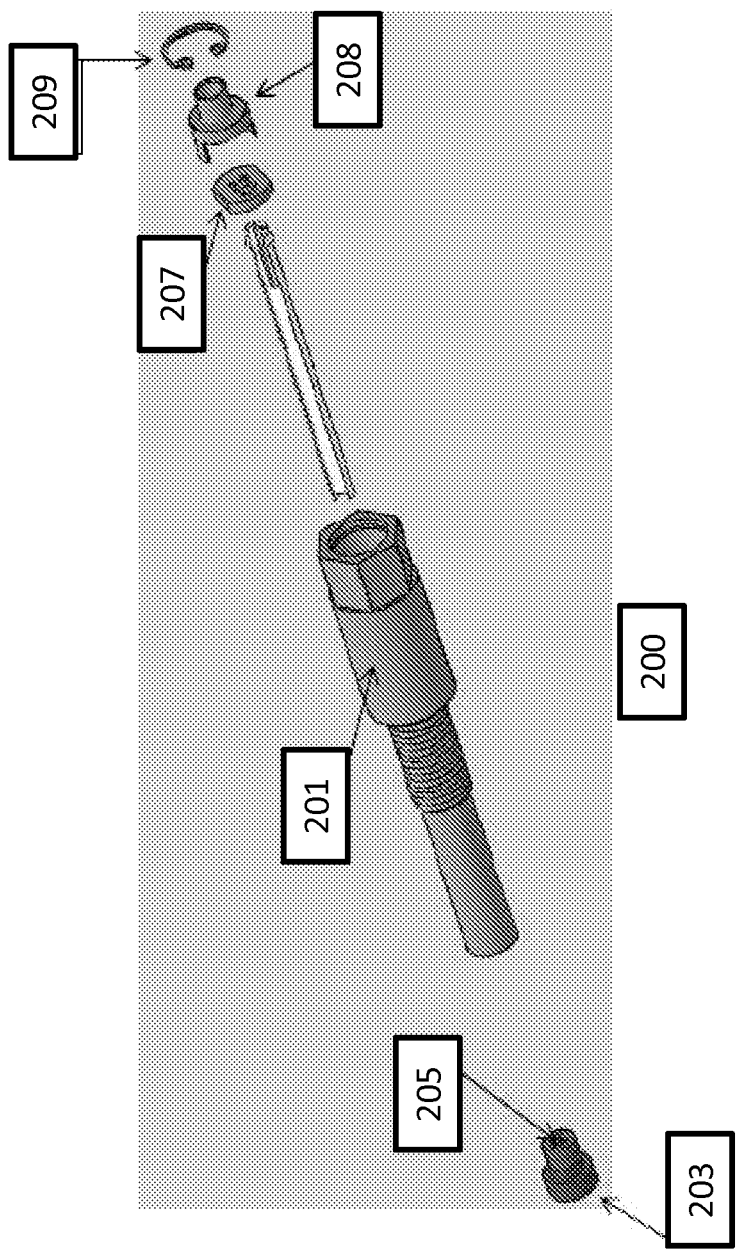

FIG. 2 depicts a schematic of a combustion sensor assembly 200 in accordance with an aspect of the present invention.

As in FIG. 2, various location and retaining features for the components that comprise the completed assembly are set forth. Tip 203 provides proximate location and bonding surfaces to position and retain the pressure sensing element 205. In a preferred embodiment, the tip 203 is concentrically aligned with sensor body 201 and the pressure sensor 205 is a MEMS pressure sensor. Those skilled in the art will appreciate that MEMS sensor proximity to the pressure port provides a near immediate signal from the MEMS sensor and high resonant frequency response due to the minimum length of the air path within tip 203.

In a preferred embodiment of the present invention, the distance from the MEMS sensor 205 to the furthermost opening in tip 203 is of a predetermined distance less than 15 mm. In a further preferred embodiment of the present invention, the distance from the MEMS sensor 205 to the furthermost opening in tip 203 is of a predetermined distance approximating less than 8 mm and being 7.72 mm. The sensor assembly further includes a printed circuit board 207 for electrical interconnection between the electrical connection cable 104 and an internal flex cable, such as internal flex cable 106 shown in FIG. 1A. Also included in the sensor assembly are wire cap 208 and retaining ring 209, which function structurally in combination to align and retain the printed circuit board 207.

Figure 3:
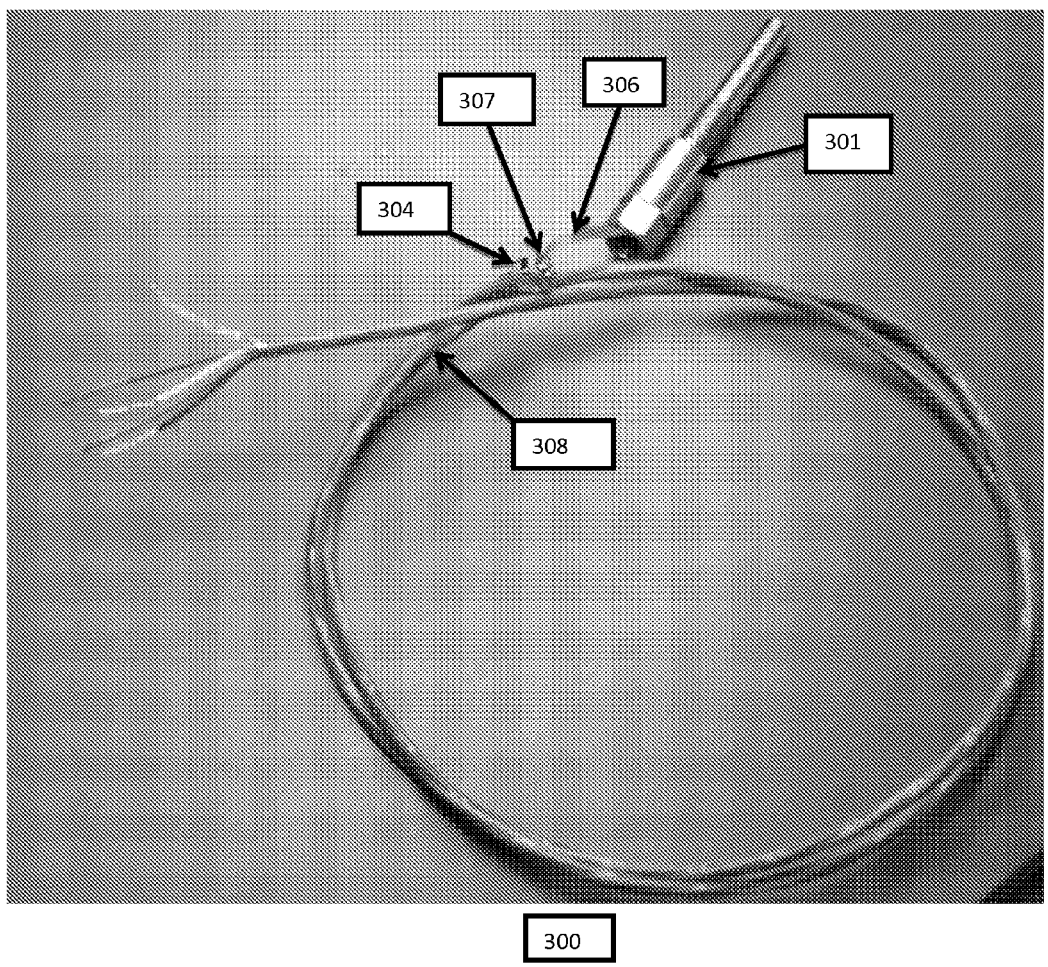
FIG. 3 illustrates a partially disassembled combustion sensor in accordance with an aspect of the present invention.

FIG. 3 illustrates a partially disassembled combustion sensor 300 in accordance with an aspect of the present invention. As set forth in FIG. 3, printed circuit board 307 forms the interconnection between flex cable 306 and cable 304. In a preferred embodiment, board 307 and cable 304 are positioned and retained in sensor body 301 by wire cap 308 and preferably fabricated from stainless steel. A retaining ring 209 (FIG. 2) is also preferably utilized. In various embodiments of the present invention, printed circuit board 307 may function structurally as well to further facilitate the cable connection, or alternatively may contain one or more of those electronics necessary to operate the sensor assembly.

Figure 4:
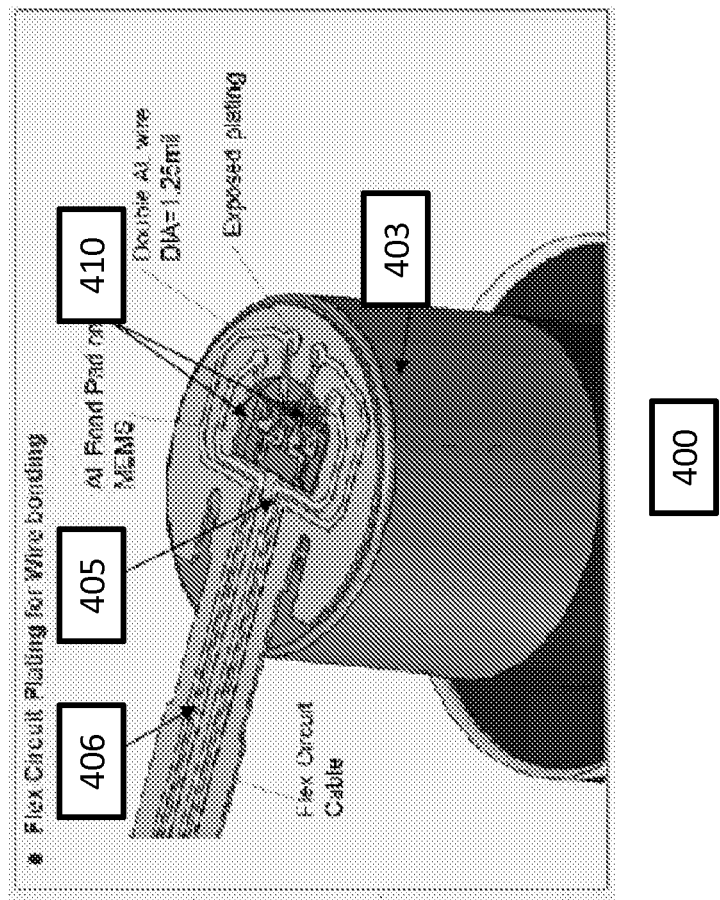
FIG. 4 sets forth a MEMS pressure sensor in accordance with an aspect of the present invention.
Figure 5:
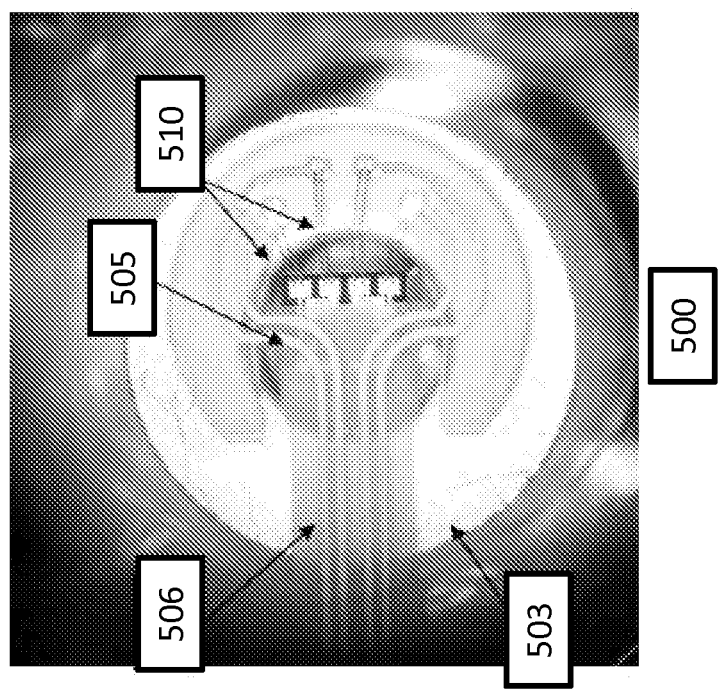
FIG. 5 illustrates a preferred embodiment of the present invention as a MEMS sensor electrical connection to power and control electronics.

Further preferred embodiments regarding the electrical connection (i.e., electrical signal communication) between the MEMS sensor assembly and the electrical conductors is illustrated in FIGS. 4 and 5.

FIG. 4 sets forth a preferred embodiment 400 of a MEMS pressure sensor in accordance with an aspect of the present invention. FIG. 5 illustrates a preferred embodiment of the present invention 500 as a MEMS sensor electrical connection to power and control electronics.

As set forth in FIGS. 4 and 5, MEMS sensor 405, 505 is permanently secured (i.e., attached) and sealed to tip 403, 503 by eutectic bond. In a preferred embodiment the seal is hermetic and flex circuit 406, 506 is bonded to an inner surface of tip 403, 503 using a high temperature epoxy. MEMS sensor to flex circuit trace connection are also completed using wire bonds 410, 510. It will be understood by those of ordinary skill in the art that the bond wires may be gold, aluminum, or any metallic round or rectangular in shape that is appropriate for wire bonding.

Figure 6:
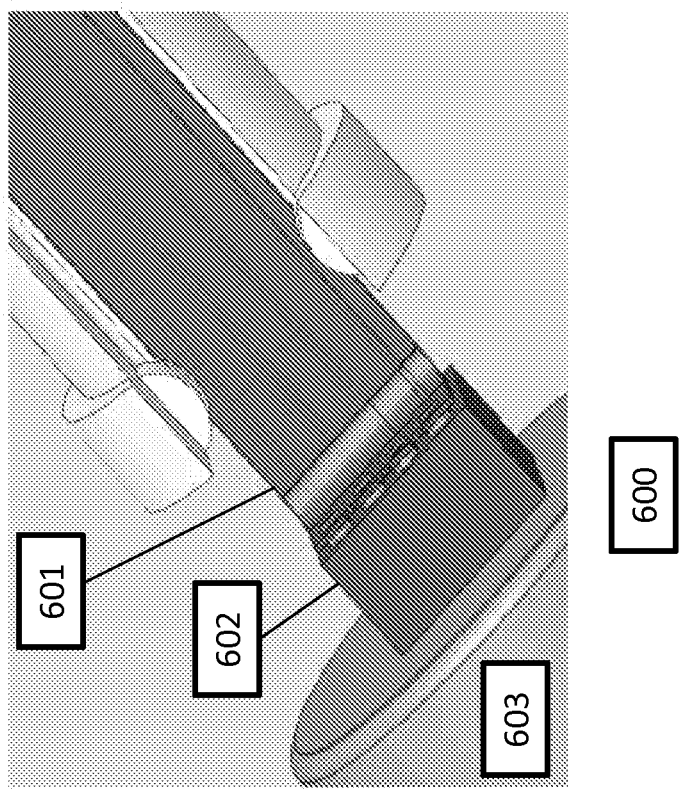
FIG. 6 presents an embodiment of the present invention as a MEMS pressure sensor electrical connection incorporating MEMS sensor direct attachment to the flex circuit.
Figure 7:
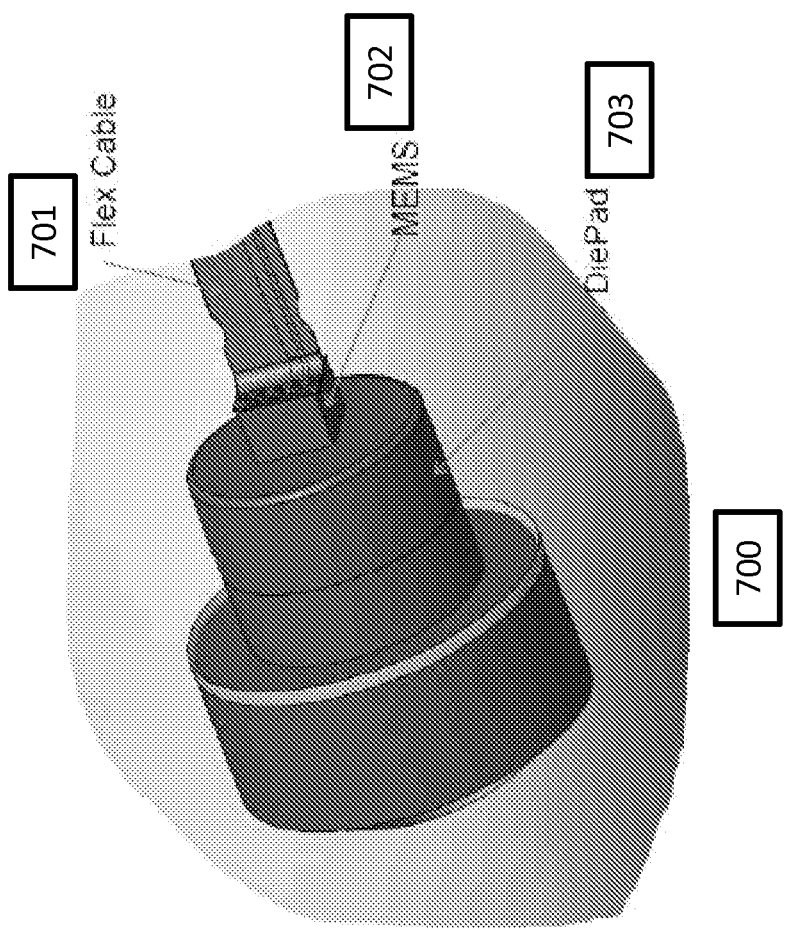
FIG. 7 presents a pictorial overview of the method of the present invention as attaching a MEMS sensor to a flex circuit.

Further alternate embodiments of the present invention are set forth in FIGS. 6 and 7. FIG. 6 presents an embodiment 600 of the present invention as a MEMS pressure sensor electrical connection incorporating MEMS sensor direct attachment to the flex circuit. FIG. 7 presents a pictorial overview 700 of the method of the present invention as attaching a MEMS sensor to a flex circuit.

As set forth in FIGS. 6 and 7, MEMS 602, 702 directly attached to the flex circuit 601, 701. In this embodiment the MEMs sensor assembly may have aluminum bond pads or gold bumps which will form the electrical connection to the flex circuit. Tips are set forth at 603, 703.

Figure 8:
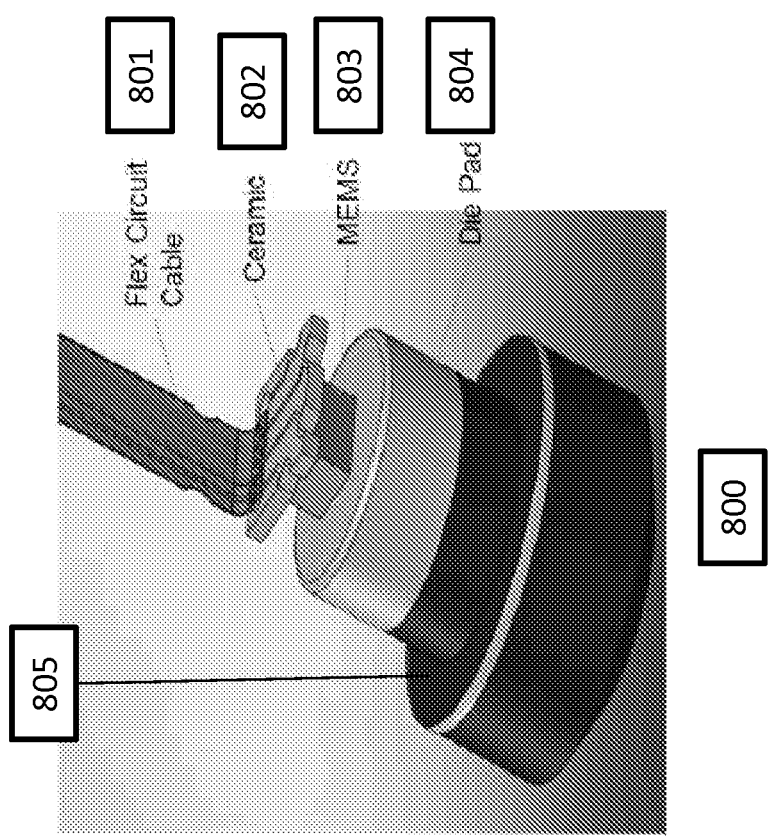
FIG. 8 illustrates a preferred embodiment of the present invention as a MEMs pressure sensor electrical connection incorporating a ceramic printed circuit board between the MEMs sensor and the flex cable.

FIG. 8 illustrates a preferred embodiment 800 of the present invention as a MEMs pressure sensor electrical connection incorporating a ceramic printed circuit board between the MEMs sensor and the flex cable. As set forth in FIG. 8, a MEMS sensor assembly 800 that is attached to the tip 805 by eutectic bond. A ceramic spacer 802 that includes wire bond pads is attached on the upper surface of the MEMS 803. The flex circuit 801 is attached to the ceramic spacer 802. A die pad is set forth at 804.

The invention can be used in a variety of applications and implementation including those which monitor combustion pressures of internal combustion engines as may be used in the automotive, marine, aviation, and recreational vehicles, and any moving or stationary assemblies incorporating internal combustion engines, such as power generators and mobile generators. It may be incorporated in diesel engines and diesel engine applications as well.

Although the present invention has been described in accordance with the embodiments shown, one of ordinary skill in the art will readily recognize that there could be variations to the embodiments and those variations would be within the spirit and scope of the present invention. The present invention disclosed herein may be configured in variety of ways including but not limited to a rugged, compact sensing device designed to meet specific needs and/or conformities for automotive, marine, and other industries that require low cost accurate pressure sensing while in challenging operating environments. Accordingly, many modifications may be made by one of ordinary skill in the art without departing from the spirit and scope of the present invention.

Although the foregoing described the invention with preferred embodiments, this is not intended to limit the invention. Indeed, embodiments of this invention can be combined with other sensors and systems, such as other temperature, fluid leveling, filtration and similar sensors. As seen from the foregoing, the embodiments of the present invention are intended to be used as a sensor assembly or in combination with other types of sensors. In this regard, the foregoing is intended to cover all modifications and alternative constructions falling within the spirit and scope of the invention as expressed in the appended claims, wherein no portion of the disclosure is intended, expressly or implicitly, to be dedicated to the public domain if not set forth in the claims.

What is claimed is:

1. A sensor assembly, comprising:
   a rigid sensor body coupled with an internal combusting device for generating a pressure during operation; wherein the rigid sensor body further comprises a tip and is coupled to the electromechanical combusting device;
   a Microelectromechanical System (MEMS) sensor permanently attached and sealed to the tip and configured at a predetermined position in relation to a distal opening of the tip;
   a flexible cable connection in electrical communication with the MEMS sensor of for transmitting an electrical signal having pressure characteristic information to an information receiving device in communication with the assembly, wherein the flexible cable connection further comprises an electronic communications board for electrical communication, a flexible communications cable for electrical communication with the information receiving device and an internal communications cable situated within the sensor body and in electrical communication with the MEMS sensor, the electronic communications board being in electrical communication with the flexible communications cable and the internal communications cable.

2. The assembly of claim 1, wherein the internal combusting device is an internal combustion engine (ICE).

3. The assembly of claim 1, wherein the MEMS sensor is a MEMS pressure sensor.

4. The assembly of claim 1, wherein the information receiving device is an electronic control in signal communication with the internal communications cable.

5. The assembly of claim 1, wherein the body is stainless steel and the internal communications cable is positioned within the sensor body using a wire cap.

6. The assembly of claim 5, wherein the body further comprises a mating means for securely fastening the assembly to the internal combusting device.

7. The assembly of claim 6, wherein the mating means is a screw thread fastener.

8. The assembly of claim 7, wherein the tip is concentrically aligned with the body and is composed of a material having a thermal coefficient of expansion similar to the MEMS sensor.

9. The assembly of claim 8, wherein the tip is a Kovar® composition.

10. The assembly of claim 8, wherein the body is fabricated to the tip by a welding process.

11. The assembly of claim 8, wherein the internal combusting device is an internal combustion engine (ICE), the information receiving device is an electronic control in signal communication with the internal communications cable, and the predetermined position is of a value less than 8 mm.

12. The assembly of claim 8, wherein the predetermined position is of a value less than 15 mm.

13. The assembly of claim 12, wherein the predetermined position is of a value less than 8 mm.

14. The assembly of claim 8, wherein electronic communications board is a circuit board comprising electronic circuitry.

15. The assembly of claim 14, wherein the MEMS sensor is sealed to the tip by a eutectic bond.

16. A mechanical packaging assembly for detecting pressure values in an internal combustion engine, the assembly comprising:
a stainless steel assembly body having electrical communication via a connectable connection and in mechanical mated connection via a fastening to an internal combustion engine; and
a micro-electromechanical system (MEMS) pressure sensor for directly sensing the pressure within the internal combustion engine by being in contact with combustion processes of the internal combustion engine, permanently attached and sealed to a tip of the body positioned at a distal end and being in electrical communication with a flexible circuit connection, wherein the MEMS pressure sensor is situated at a predetermined distance from an opening of the tip; wherein the flexible circuit connection transmits an electrical signal having pressure characteristic information from the MEMS pressure sensor to an information receiving device in communication with the assembly and the flexible circuit connection further comprises an electronic communications board for electrical communication, a flexible communications cable for electrical communication with the information receiving device and an internal communications cable situated within the assembly body and in electrical communication with the MEMS sensor, the electronic communications board being in electrical communication with the flexible communications cable and the internal communications cable.

17. The assembly of claim 16, wherein the predetermined distance is less than 15 mm.

18. The assembly of claim 17, wherein the internal combustion engine is one of an automotive engine, a generator, a marine power system and a mobile combustion device, and the connectable connection is configured to communicate an electrical signal to an electronic controller.

19. An internal combustion engine further including a pressure monitoring assembly comprising:
a stainless steel body in electrical signal communication and mechanically fastened to the engine; and
a micro-electromechanical system (MEMS) pressure sensor permanently attached and sealed to a tip of the body and in electrical signal communication via wire bonds to a flexible circuit connection, wherein the MEMS pressure sensor directly senses the pressure within the internal combustion engine by being in contact with combustion processes of the internal combustion engine, wherein the pressure sensor is permanently attached and sealed less than 15 mm from the tip and the flexible circuit connection for transmitting an electrical signal having pressure characteristic information determined from the MEMS pressure sensor to a controller in communication with the assembly; wherein the flexible circuit connection for transmitting an electrical signal having pressure characteristic information from the MEMS pressure sensor to the controller in communication with the assembly and the flexible circuit connection further comprises an electronic communications board for electrical communication, a flexible communications cable for electrical communication with the controller and an internal communications cable situated within the assembly body and in electrical communication with the MEMS sensor, the electronic communications board being in electrical communication with the flexible communications cable and the internal communications cable; and wherein the body further comprises a mating means for securely fastening the assembly and the tip is concentrically aligned with the body and is composed of a material having a thermal coefficient of expansion similar to MEMS pressure sensor.

* * * * *